United States Patent
Dudar et al.

(10) Patent No.: US 9,689,350 B2
(45) Date of Patent: Jun. 27, 2017

(54) SYSTEM AND METHODS FOR MECHANICAL VACUUM PUMP EXHAUST

(71) Applicant: Ford Global Technologies, LLC, Dearborn, MI (US)

(72) Inventors: Aed M. Dudar, Canton, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 14/723,259

(22) Filed: May 27, 2015

(65) Prior Publication Data

US 2016/0348614 A1    Dec. 1, 2016

(51) Int. Cl.
| | | |
|---|---|---|
| F02M 25/08 | (2006.01) |
| B60T 13/46 | (2006.01) |
| B60T 17/02 | (2006.01) |
| F01M 13/00 | (2006.01) |

(52) U.S. Cl.
CPC ......... *F02M 25/0809* (2013.01); *B60T 13/46* (2013.01); *B60T 17/02* (2013.01); *F01M 13/00* (2013.01); *F02M 25/0836* (2013.01); *F02M 25/0872* (2013.01)

(58) Field of Classification Search
CPC .. F02M 13/025; F02M 13/04; F02M 25/0809; F02M 25/0836; F02M 25/0872; B60T 13/10
USPC .......... 123/41.86, 516–521, 198 D; 701/103, 701/104; 73/49.7, 114.38, 114.39
See application file for complete search history.

(56) References Cited

U.S. PATENT DOCUMENTS

| | | | |
|---|---|---|---|
| 5,499,616 A * | 3/1996 | Enright | F01M 13/023 123/572 |
| 5,542,401 A | 8/1996 | Newarski | |
| 5,785,015 A * | 7/1998 | Philippe | F02B 33/02 123/560 |
| 7,159,582 B2 * | 1/2007 | Nakajima | F02M 25/06 123/572 |
| 7,543,573 B2 | 6/2009 | Olree | |
| 2010/0288214 A1 * | 11/2010 | Pelmear | F02B 77/14 123/41.86 |
| 2011/0197864 A1 * | 8/2011 | Karcher | F02M 25/089 123/574 |
| 2011/0239965 A1 * | 10/2011 | Ingelfinger | F01M 13/023 123/41.86 |
| 2014/0060160 A1 | 3/2014 | Pursifull | |
| 2014/0076249 A1 | 3/2014 | Rollinger et al. | |
| 2014/0081546 A1 | 3/2014 | Yasui | |
| 2014/0081548 A1 | 3/2014 | Pursifull et al. | |

(Continued)

Primary Examiner — John Kwon
Assistant Examiner — Johnny H Hoang
(74) Attorney, Agent, or Firm — James Dottavio; McCoy Russell LLP

(57) ABSTRACT

A system for an engine is provided, the system comprising a vacuum pump at least partially deposed within an engine crankcase, and a fuel vapor canister coupled to an exhaust conduit of the vacuum pump via a one-way valve. By coupling the vacuum pump exhaust to the fuel vapor canister, unmetered fuel vapor flow to the engine intake may be reduced, thus decreasing engine stall events. Further, crankcase pressure may more accurately represent airflow through the crankcase via a crankcase ventilation system, thereby improving the accuracy of crankcase ventilation diagnostics.

18 Claims, 13 Drawing Sheets

(56) References Cited

U.S. PATENT DOCUMENTS

| | | | |
|---|---|---|---|
| 2014/0081549 A1* | 3/2014 | Rollinger | F01M 13/00 701/101 |
| 2014/0081550 A1* | 3/2014 | Jentz | F01M 1/18 701/101 |
| 2014/0081551 A1 | 3/2014 | Rollinger et al. | |
| 2014/0081564 A1 | 3/2014 | Pursifull et al. | |
| 2014/0096754 A1* | 4/2014 | Monros | F01M 13/0011 123/574 |

* cited by examiner

SYSTEM AND METHODS FOR MECHANICAL VACUUM PUMP EXHAUST

FIELD

The present description relates generally to methods and systems for controlling a vehicle engine to divert exhaust from a mechanical vacuum pump out of an engine crankcase.

BACKGROUND/SUMMARY

Engines may include crankcase ventilation systems to vent gasses out of the crankcase, which may reduce degradation of engine components housed within the crankcase. A typical crankcase ventilation system couples the crankcase to intake via a crankcase ventilation tube (fresh air hose). The ventilation tube may be monitored to identify degradation that limits crankcase ventilation. For example, if the ventilation tube is disconnected at either the intake side or the crankcase side, airflow through the canister may be limited.

A pressure sensor within the crankcase ventilation tube or the crankcase itself may be utilized to diagnose degradation within the crankcase ventilation system. However, merely indicating a crankcase pressure may be insufficient to determine the location of the degradation, yielding a more time consuming and costly repair. Other attempts to discern crankcase ventilation breaches include adding additional sensors, or performing diagnostic tests during when specific canister pressure profiles are expected. One example approach is shown by Rollinger et al. in U.S. 2014/0081549. Therein, crankcase-side degradation of the fresh air tube is determined at engine crank when a pressure dip in the crankcase is expected, and intake-side degradation of the fresh air tube is determined when intake manifold airflow is increasing and crankcase pressure is expected to be decreasing.

However, the inventors herein have recognized potential issues with such systems. As one example, crankcase pressure may change due to reasons unrelated to intake air flow. For example, a mechanical vacuum pump (e.g., brake booster pump) may be deposed at least partially within the crankcase to ensure the pump is lubricated. However, if the vacuum pump exhausts into the crankcase, the crankcase pressure may change, yielding a crankcase pressure profile similar to those for a degraded crankcase ventilation tube. This may result in false-fail results of crankcase ventilation integrity tests. If the vacuum pump exhausts directly to intake, it may represent an additional source of unmetered fuel entering intake, which may lead to an increase in engine stalls.

In one example, these issues may be addressed by a system for an engine, the system comprising a vacuum pump at least partially deposed within an engine crankcase, and a fuel vapor canister coupled to an exhaust conduit of the vacuum pump via a one-way valve. By coupling the vacuum pump exhaust to the fuel vapor canister, unmetered fuel vapor flow to the engine intake may be reduced, thus decreasing engine stall events. Further, crankcase pressure may more accurately represent airflow through the crankcase via a crankcase ventilation system, thereby improving the accuracy of crankcase ventilation diagnostics. In this way, false-failures of crankcase ventilation integrity tests may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
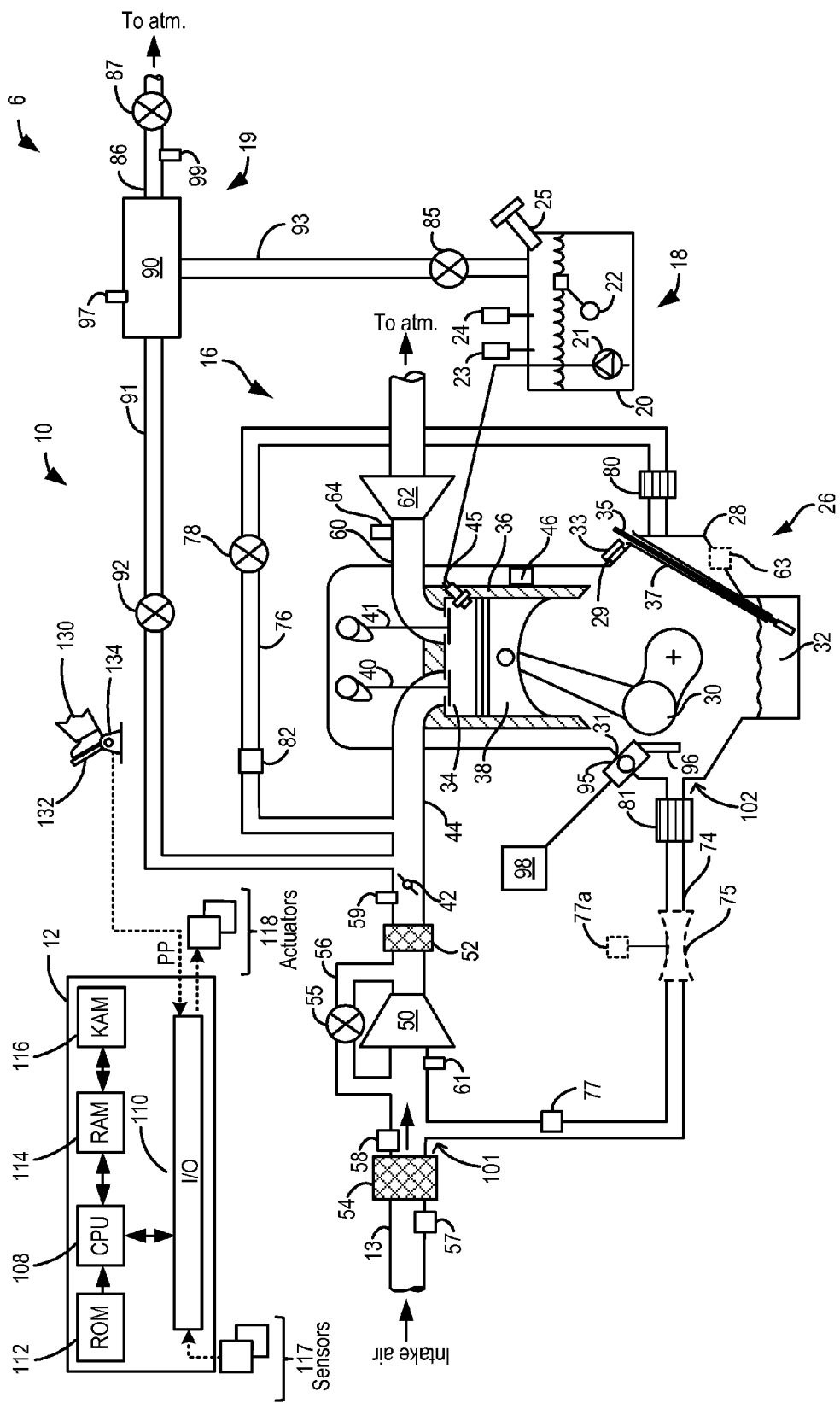
FIG. 1 schematically shows an example engine coupled to a fuel system.
Figure 3:
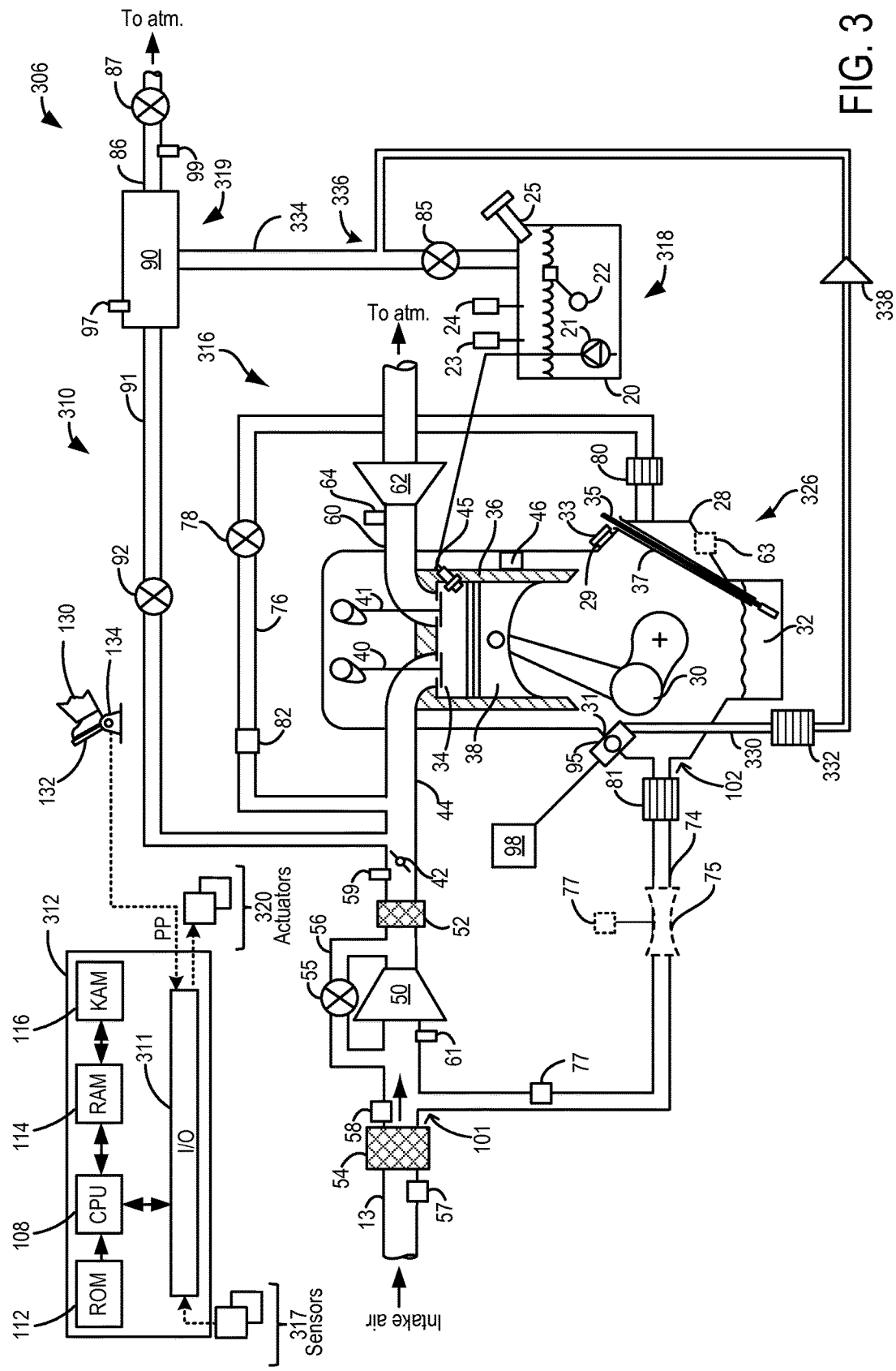
FIG. 3 schematically shows an example engine system comprising a mechanical vacuum pump including an exhaust conduit coupled to a fuel vapor canister.
Figure 4A:
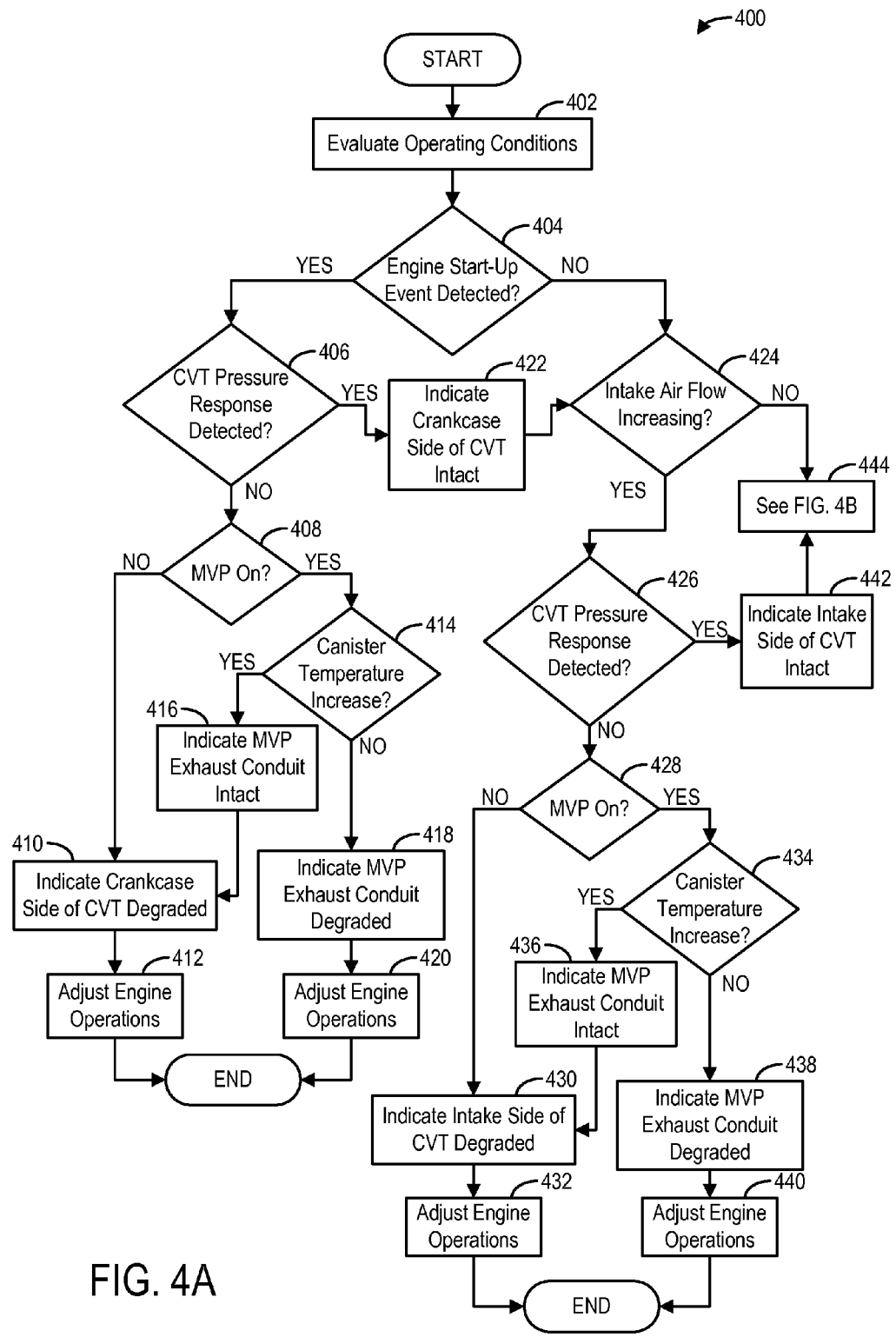
FIGS. 4A-4B show a flowchart for a high level method for operating the example engine system of FIG. 3.
Figure 4B:
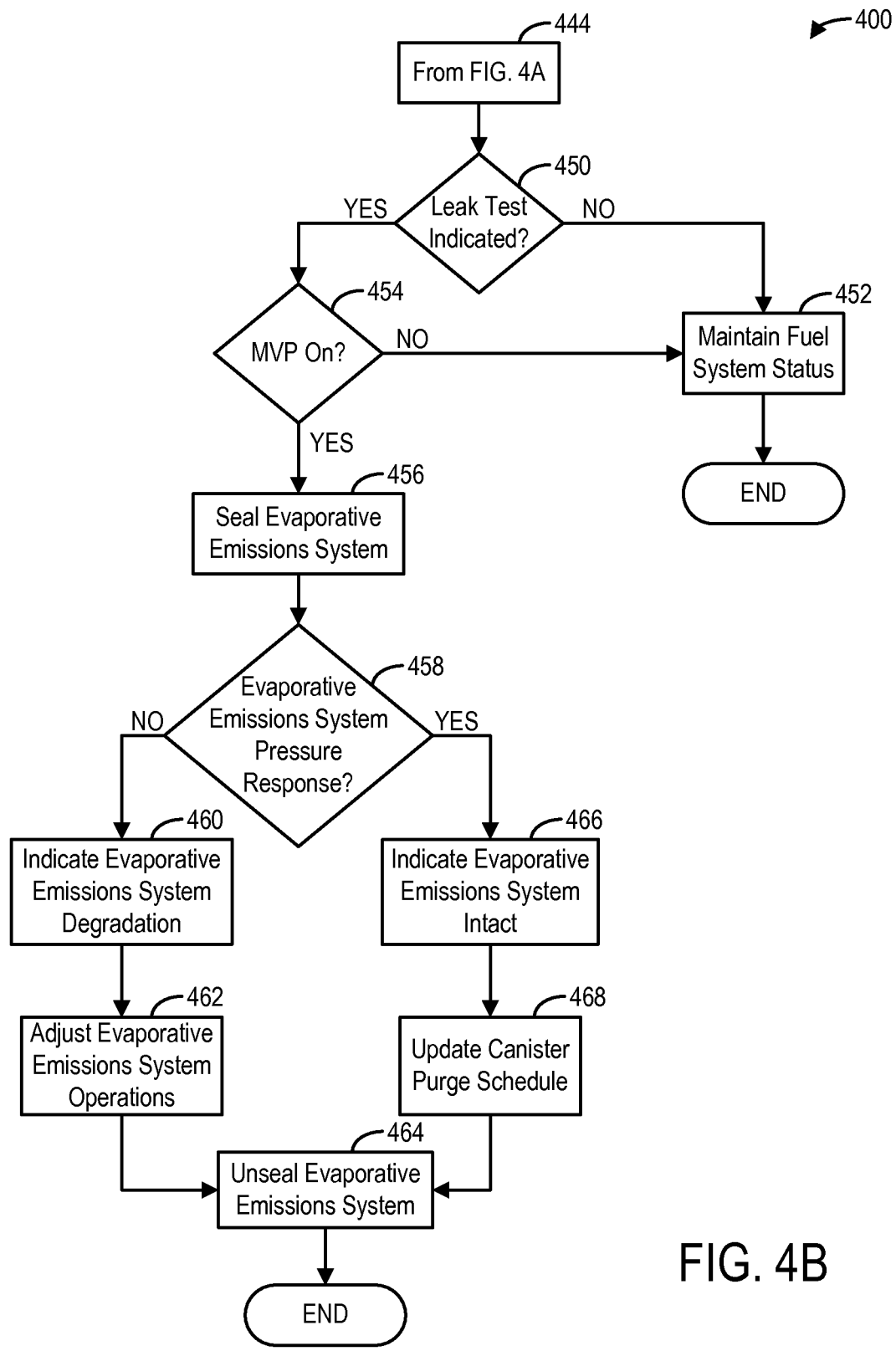
Figure 5A:
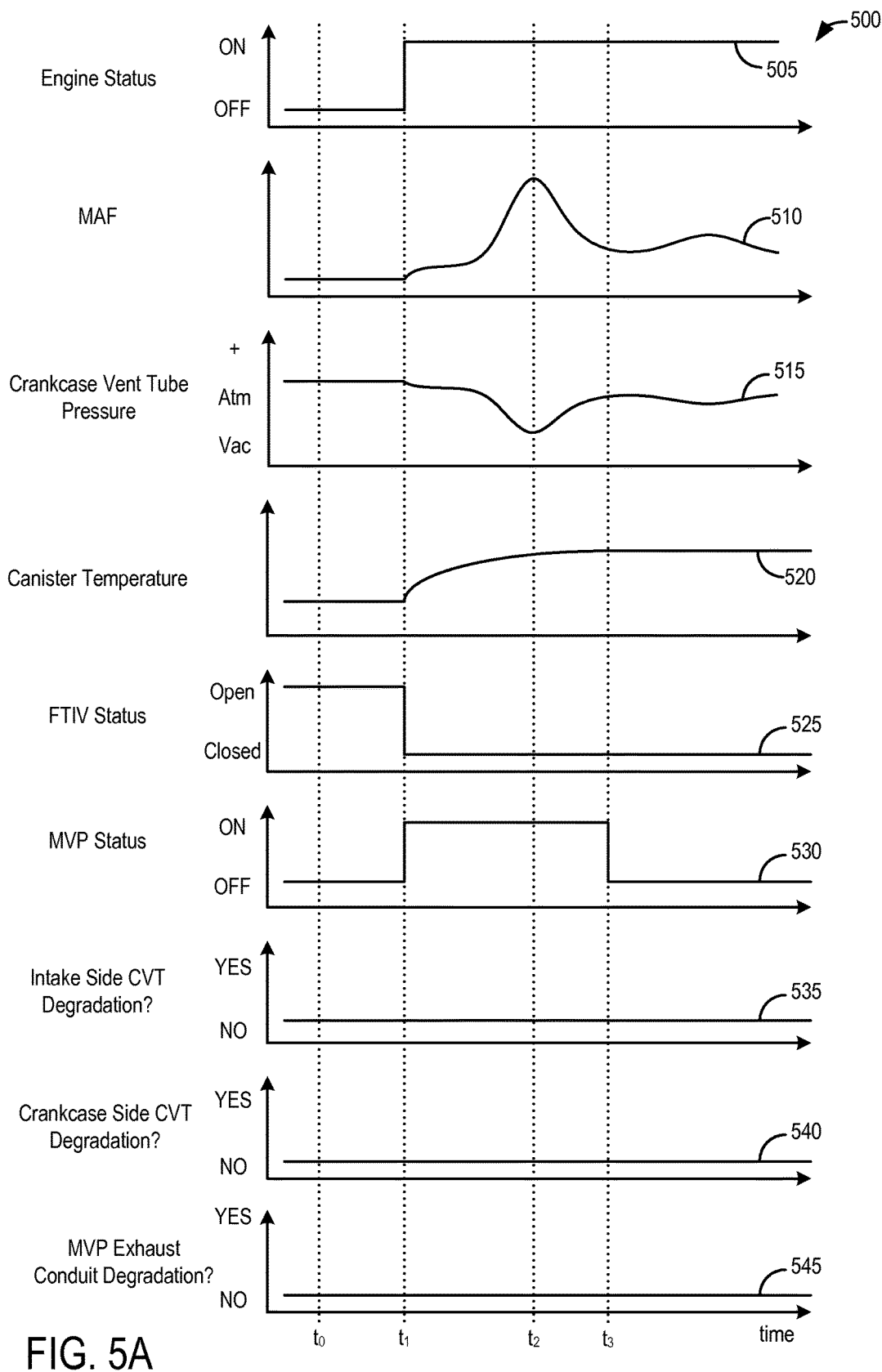
FIGS. 5A-5B show example timelines for crankcase-side crankcase vent tube diagnostic tests.
Figure 5B:
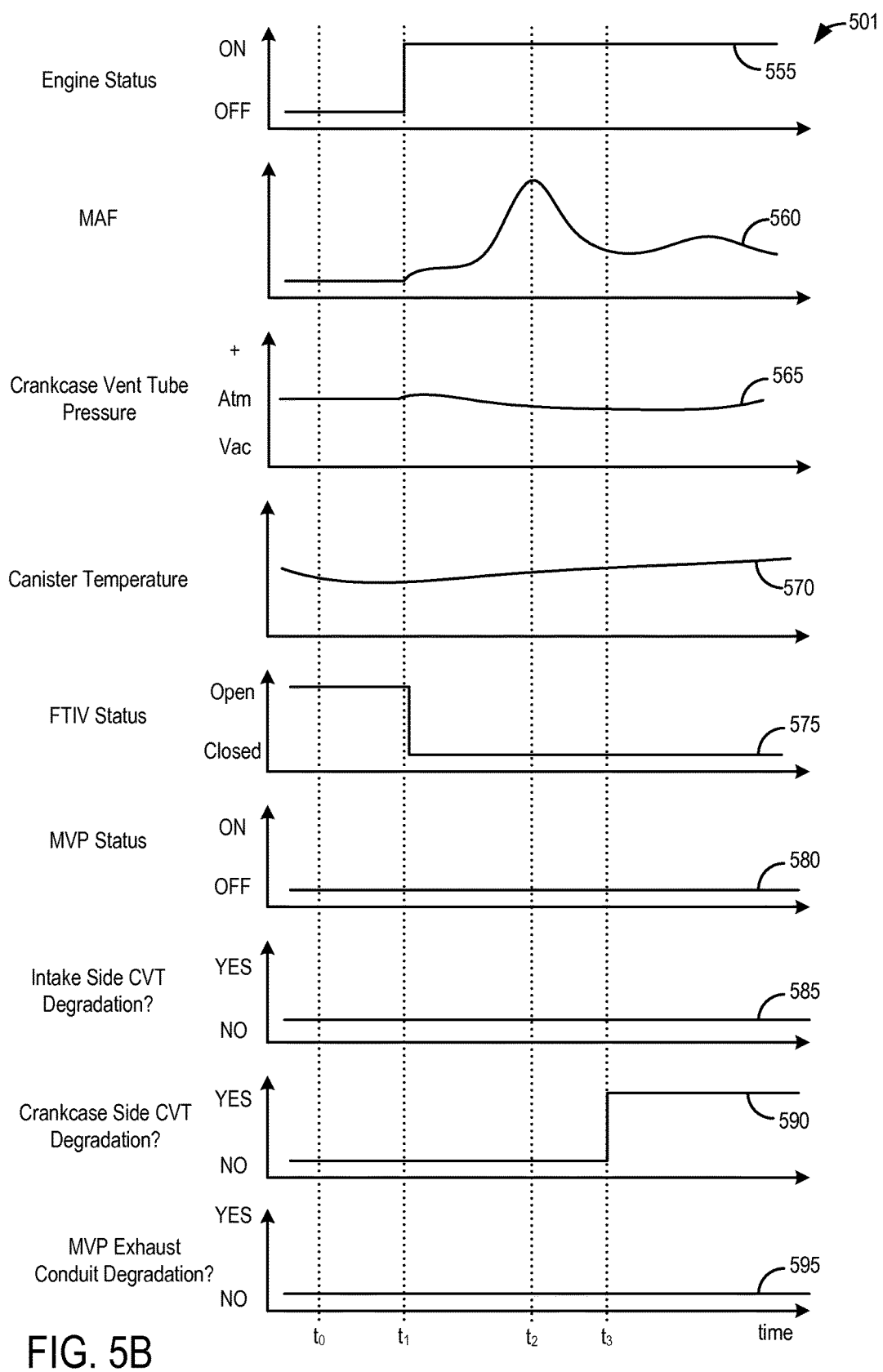
Figure 6A:
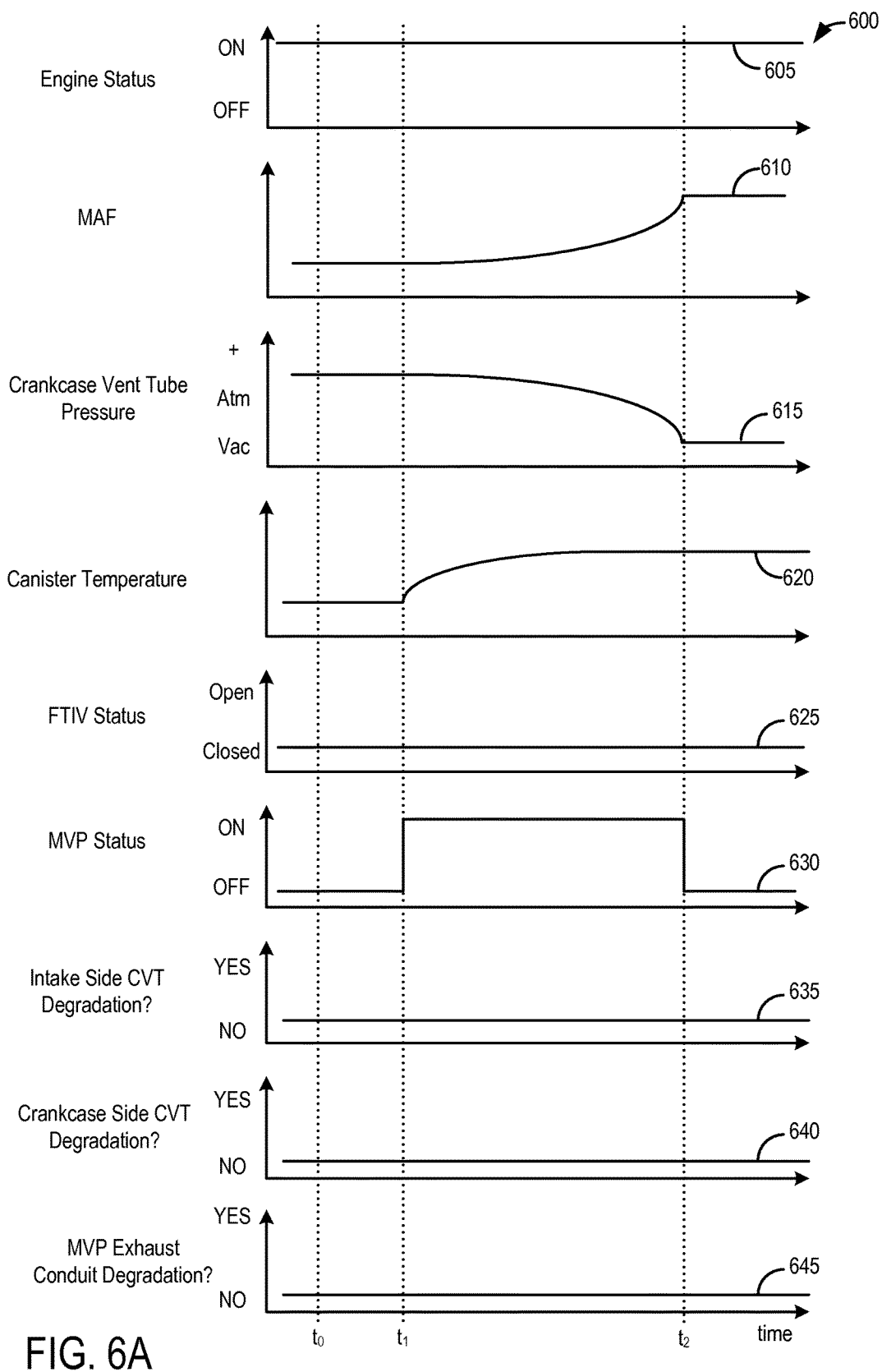
FIGS. 6A-6B show example timelines for intake-side crankcase vent tube diagnostic tests.
Figure 6B:
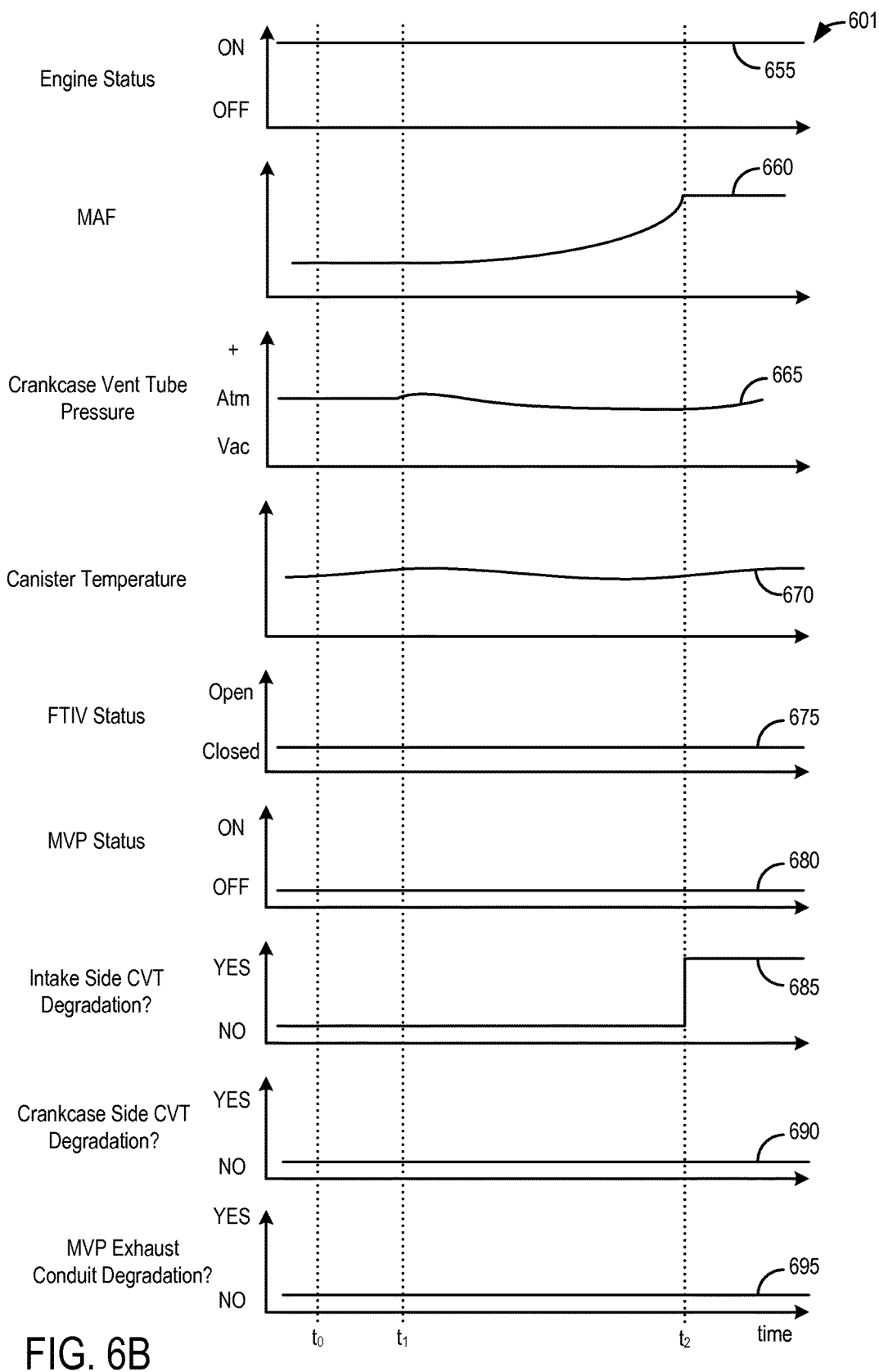
Figure 7:
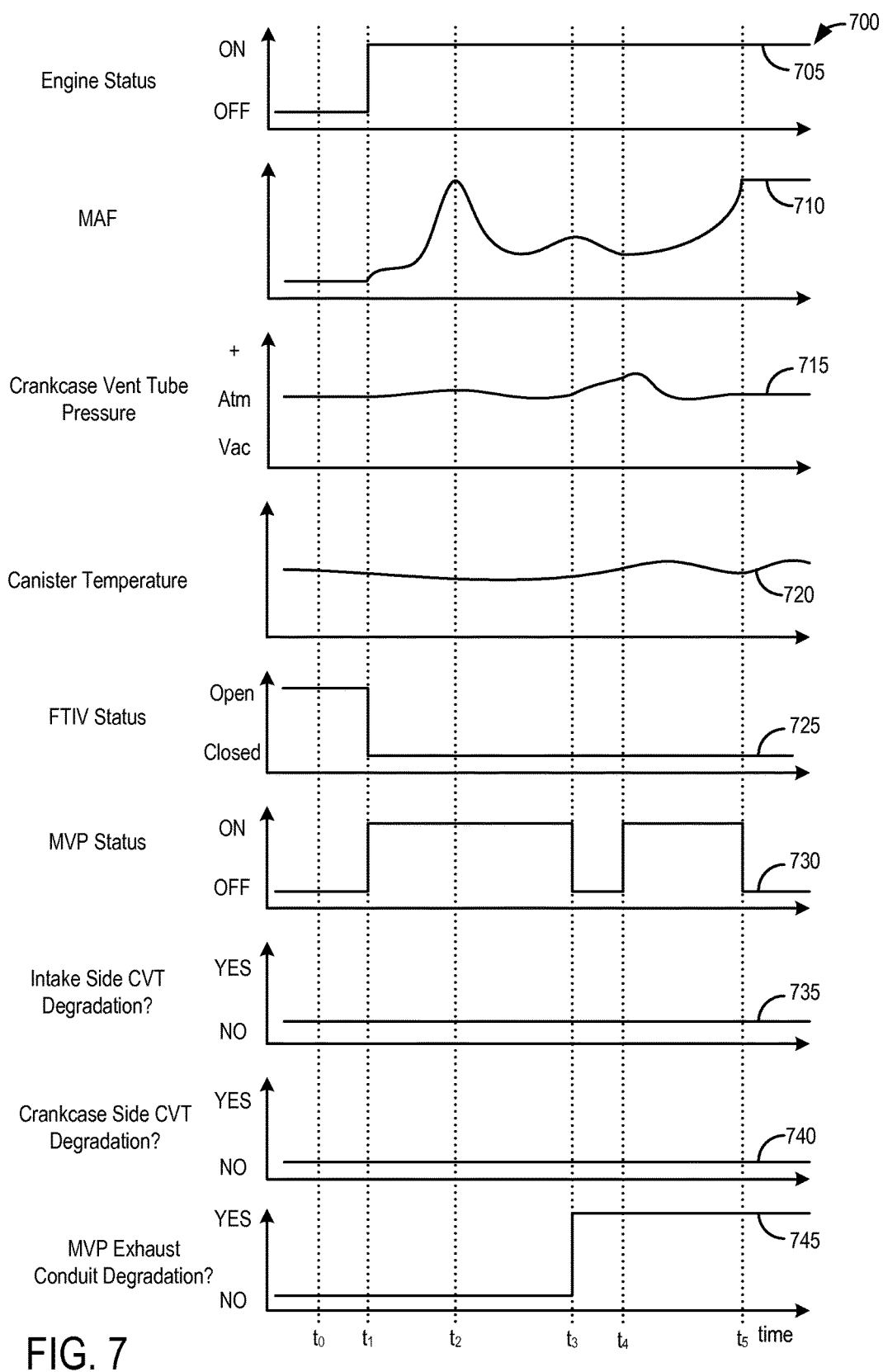
FIG. 7 shows an example timeline for a mechanical vacuum pump exhaust conduit diagnostic test.
Figure 8:
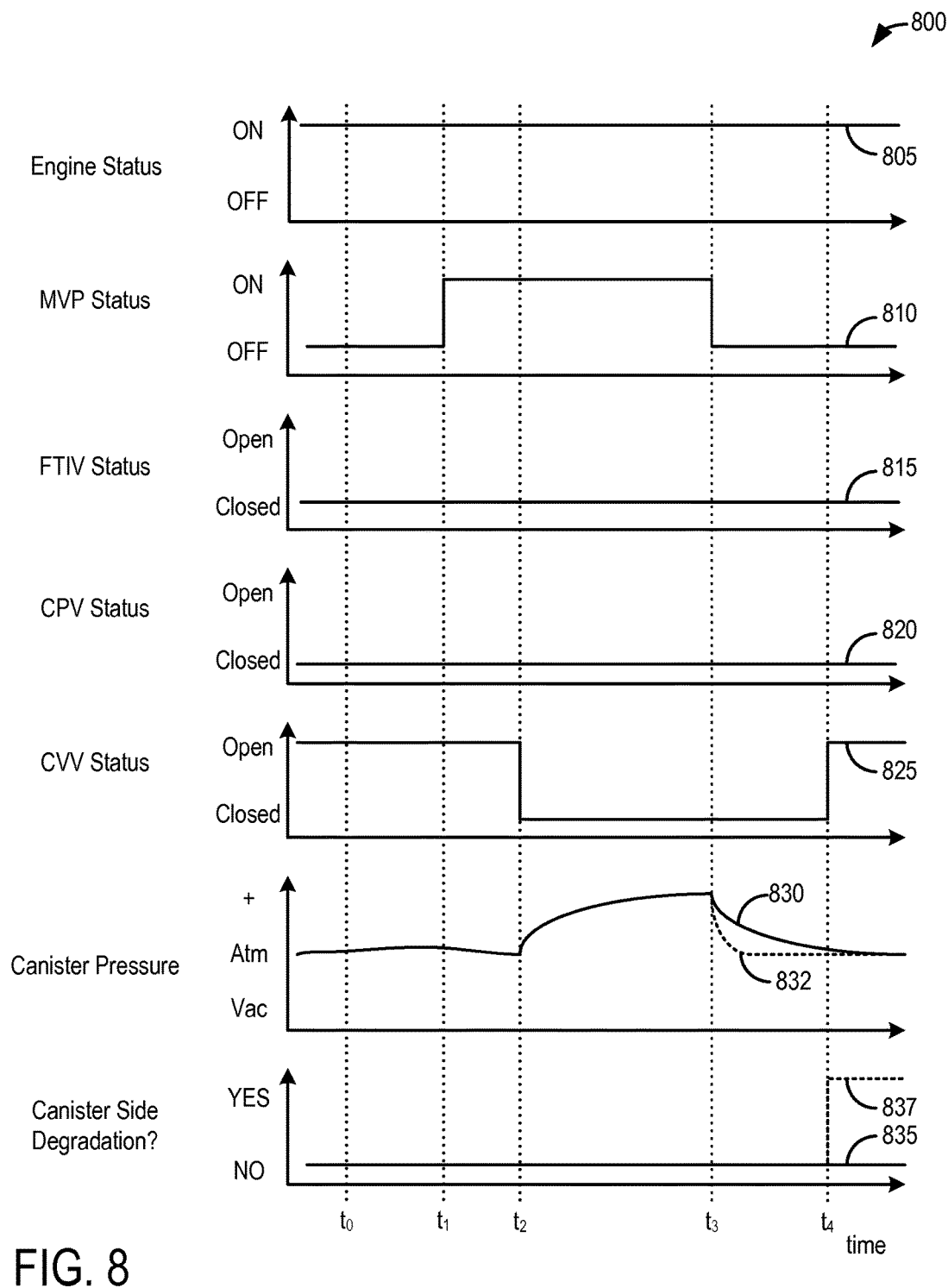
FIG. 8 shows an example timeline for an evaporative emissions leak test.

The following description relates to systems and methods for a vehicle engine comprising a mechanical vacuum pump housed within the engine crankcase. An example vehicle engine is shown in FIG. 1. The engine crankcase may be coupled to an engine intake via a crankcase ventilation system including crankcase ventilation tubes. Diagnosis of crankcase ventilation degradation may be made based on crankcase pressure profiles during specific engine conditions, as shown by the timelines in FIGS. 2A-2C. However, if the vacuum pump is configured to exhaust gasses into the crankcase, the crankcase pressure profile may resemble that for a degraded system, and a false-fail result may be recorded. To mitigate this, the vacuum pump exhaust may be routed outside of the crankcase to a fuel vapor canister, as shown in FIG. 3. In this way, exhaust gasses may be captured at the canister, and the crankcase pressure is uncoupled from the vacuum pump status. This system may enable one or more methods for determining crankcase ventilation system integrity, such as the method shown in FIGS. 4A-4B. The methods may determine vacuum pump exhaust integrity based on canister temperature profiles, and the vacuum pump exhaust may also be used to pressurize the evaporative emissions system for leak testing. Example timelines for crankcase-side crankcase vent tube diagnostic tests are shown in FIGS. 5A-5B. Example timelines for intake-side crankcase vent tube diagnostic tests are shown in FIGS. 6A-6B. An example timeline for a mechanical vacuum pump exhaust conduit diagnostic test is shown in FIG. 7, while FIG. 8 shows an example timeline for an evaporative emissions leak test.

FIG. 1 shows a schematic depiction of a hybrid vehicle system 6 that can derive propulsion power from engine system 10 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12 (described in more detail below herein).

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated. Intake air may bypass compressor 50 via compressor bypass conduit 56, during conditions wherein compressor bypass valve (CBV) 55 is opened. In this way, pressure buildup at the compressor inlet may be relieved.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor. When configured as a pressure sensor, sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a one-way PCV valve 78 (that is, a passive valve that tends to seal when flow is in the opposite direction) to provide continual evacuation of crankcase gases from inside the crankcase 28 before connecting to the intake manifold 44. In one embodiment, the PCV valve may vary its flow restriction in response to the pressure drop across it (or flow rate through it). However, in other examples PCV line 76 may not include a one-way PCV valve. In still other examples, the PCV valve may be an electronically controlled valve that is controlled by controller 12. It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 10 further includes one or more vacuum consumption devices 98. A mechanical vacuum pump (MVP) 95 is coupled to vacuum consumption device 98 and is configured to provide vacuum for operating or actuating the vacuum consumption devices. MVP 95 may be driven mechanically by crankshaft 30. As such, MVP 95 may be located at least partially within crankcase 28, for example, coupled to crankcase cover 31. In this way, MVP 95 may receive lubricating oil without requiring additional lubricant routing. In one example, vacuum consumption device 98 may be a brake booster wherein vacuum pump 95 is actuated responsive to vehicle brake application. For example, the brake booster may include an internal vacuum reservoir that amplifies a force provided by a vehicle operator 130 via a brake pedal for applying vehicle brakes (not shown). A position of the brake pedal may be monitored by a brake pedal sensor. MVP 95 may be selectively operated via a control signal from the controller 12 to supply at least some vacuum to the brake booster. MVP 95 may be coupled to one or more additional vacuum consumption devices, such as a speed control actuator or HVAC system doors. As shown in FIG. 1, MVP 95 exhausts into crankcase 28 via exhaust conduit 96. Hydrocarbons present in the crankcase cover near the MVP may thus be brought into the crankcase. Engine vacuum may be utilized purge the crankcase hydrocarbons to intake manifold 44. In contrast, if MVP 95 were exhausted directly into intake manifold 44, this may bring unmetered fuel into the engine, thus increasing the risk of engine stalling events due to rich fuel vapor slugs.

Engine system 8 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor canister 90, via conduit 93, before being purged to engine intake manifold 44.

Fuel vapor canister 90 may be comprised in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve 92. While a single canister 90 is shown, it will be appreciated that fuel system 18 may include any number of canisters. In one example, canister purge valve 92 may be a solenoid valve wherein opening or closing of the valve is performed via actuation of a canister purge solenoid.

Canister 90 may include a buffer (or buffer region), each of the canister and the buffer comprising the adsorbent. The volume of the buffer may be smaller than (e.g., a fraction of) the volume of canister 90. The adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent 86 for routing gases out of the canister 90 to the atmosphere when storing, or trapping, fuel vapors from fuel tank 20. Vent 86 may also allow fresh air to be drawn into fuel vapor canister 90 when purging stored fuel vapors to engine intake passage 13 via purge line 91 and purge valve 92. While this example shows vent 86 communicating with fresh, unheated air, various modifications may also be used. Vent 86 may include a canister vent valve 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when purge valve 92 and canister vent valve 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In the depicted example, a canister pressure sensor 99 is coupled to canister vent 86, between canister 90 and canister vent valve 87. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine. When a pressure sensor is included upstream of isolation valve 85, such as canister pressure sensor 99, an evaporative emissions system leak may be indicated based on changes in canister pressure during a leak diagnostic routine while isolation valve 85 is maintained closed.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and canister 90. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling), and/or the quantity of fuel vapor desorbed during a purging operation. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 9 may be regulated by canister purge valve 92, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 91 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and canister vent valve 87 while closing canister purge valve (CPV) 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and canister vent valve 87, while maintaining canister purge valve 92 closed, to depressurize the fuel tank before allowing enabling fuel to be added therein. As such, isolation valve 85 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; crankcase vent tube pressure sensor 77, BP sensor 57, CIP sensor 61, TIP sensor 59, etc. Furthermore, controller 12 may monitor and adjust the position of various actuators 118 based on input received from the various sensors. These actuators may include, for example, throttle 42, intake and exhaust valve systems 40, 41, and PCV valve 78. Storage medium read-only memory 112 can be programmed with computer readable data representing instructions executable by processor 108 for performing the methods described below, as well as other variants that are anticipated but not specifically listed. An example method is described herein with reference to FIGS. 4A-4B.

Controller 12 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Controller 12 may further be configured to receive information via the internet or other communication networks. Information received from the GPS may be cross-referenced to information available via the internet to determine local weather conditions, local vehicle regulations, etc. Controller 12 may use the internet to obtain updated software modules which may be stored in non-transitory memory.

Controller 12 may also be configured to intermittently perform leak detection routines on fuel system 18 and/or evaporative emissions system 19 to confirm that the fuel system and evaporative emissions system are not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

Further, controller 12 may be configured to intermittently perform leak detection routines on the crankcase ventilation system. This may include monitoring an output of crankcase vent line pressure sensor 77 when pre-determined conditions are met. For example, during engine cranking, intake manifold vacuum may be low. As such, the PCV valve may be open, causing a threshold flow of air through the crankcase and back into the intake manifold. As the engine speed increases following cranking, the manifold airflow increases. This may decrease the airflow through the crankcase vent line. In a V-type engine, this sequence of events causes a characteristic dip in the crankcase vent line pressure. However, if the crankcase vent line is disconnected at the crankcase side (e.g., second side 102), the characteristic dip may not be observed, and degradation of the crankcase vent line may be indicated.

Figure 2A:
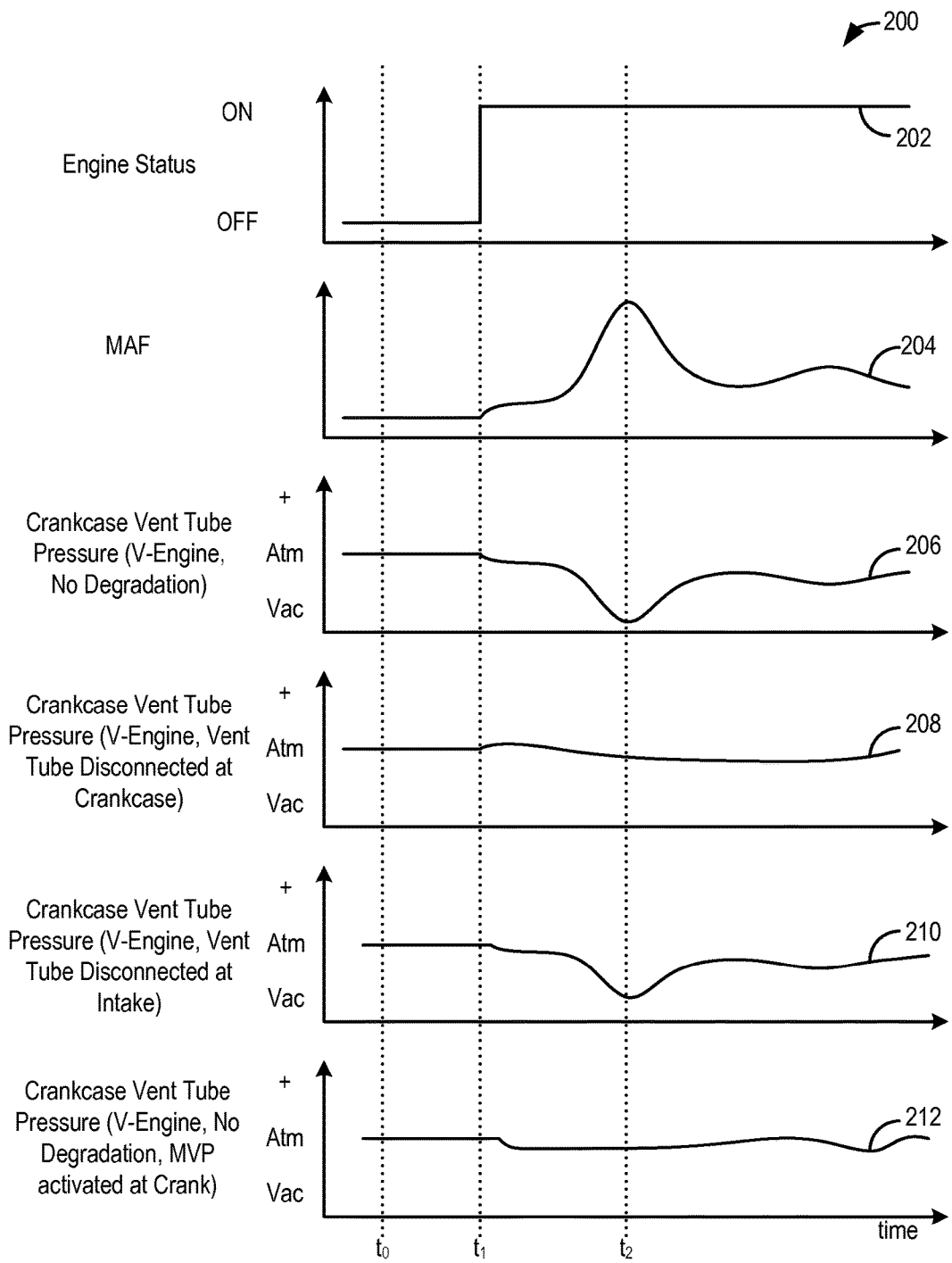
FIGS. 2A-2C show example timelines for crankcase vent tube diagnostic tests.

An example timeline 200 for engine crank in a V-type engine is shown in FIG. 2A. Specifically, timeline 200 shows crankcase vent tube pressure profiles at engine crank under various conditions. Timeline 200 includes plot 202, indicating an engine status over time, and plot 204, indicating an intake manifold air flow (MAF) over time. Timeline 200 further includes plot 206, indicating a crankcase vent tube pressure profile for an intact crankcase vent tube; plot 208, indicating a crankcase vent tube pressure profile where the vent tube is disconnected at the crankcase; and plot 210, indicating a crankcase vent tube pressure profile where the vent tube is disconnected at intake. Timeline 200 further includes plot 212, indicating a crankcase vent tube pressure profile where the vent tube is intact and the mechanical vacuum pump (MVP) is activated at engine crank.

At time $t_0$, the engine is off, as shown by plot 202. Accordingly, there is no airflow through the intake manifold, as shown by plot 204. For each of the scenarios shown by plots 206-212, the crankcase vent tube pressure is at atmosphere. At time $t_1$, the engine is turned on, and the MAF increases, peaking at time $t_2$, before decreasing to an equilibrium level. As shown in plot 206, with no vent tube degradation, the crankcase vent tube pressure experiences a dip that coincides with the peak MAF at time $t_2$. If the vent tube is disconnected at the crankcase, no significant dip in vent tube pressure is experienced, as shown by plot 208. This vent tube pressure profile may be used to diagnose a vent tube disconnected at the crankcase.

If the vent tube is disconnected at intake, the vent tube pressure may decrease, as shown by plot 210, as intake vacuum may draw air through the PCV line, crankcase, and vent tube. The pressure dip may have a different amplitude, timing, or duration relative to the peak MAF. In some scenarios, this may be used to diagnose a vent tube disconnected at intake.

If the MVP is activated at time $t_1$ (e.g., in response to demand from one or more vacuum devices) no significant dip in vent tube pressure may be experienced even if the vent tube is intact, as shown by plot 212. As shown in FIG. 1, if the MVP exhaust conduit is coupled within the crankcase, exhaust from the MVP may increase the pressure in the crankcase when the MVP is activated, thus overwhelming the pressure dip occurring at engine crank. As such, an erroneous crankcase ventilation degradation code may be set.

For an inline (I-type) engine, engine crank causes a pressure pulse in the intake manifold, and an inverted pressure pulse in the crankcase. As such, the absence of a pressure pulse in the crankcase vent line at engine crank may be indicative that the crankcase vent line is disconnected at the crankcase side.

Figure 2B:
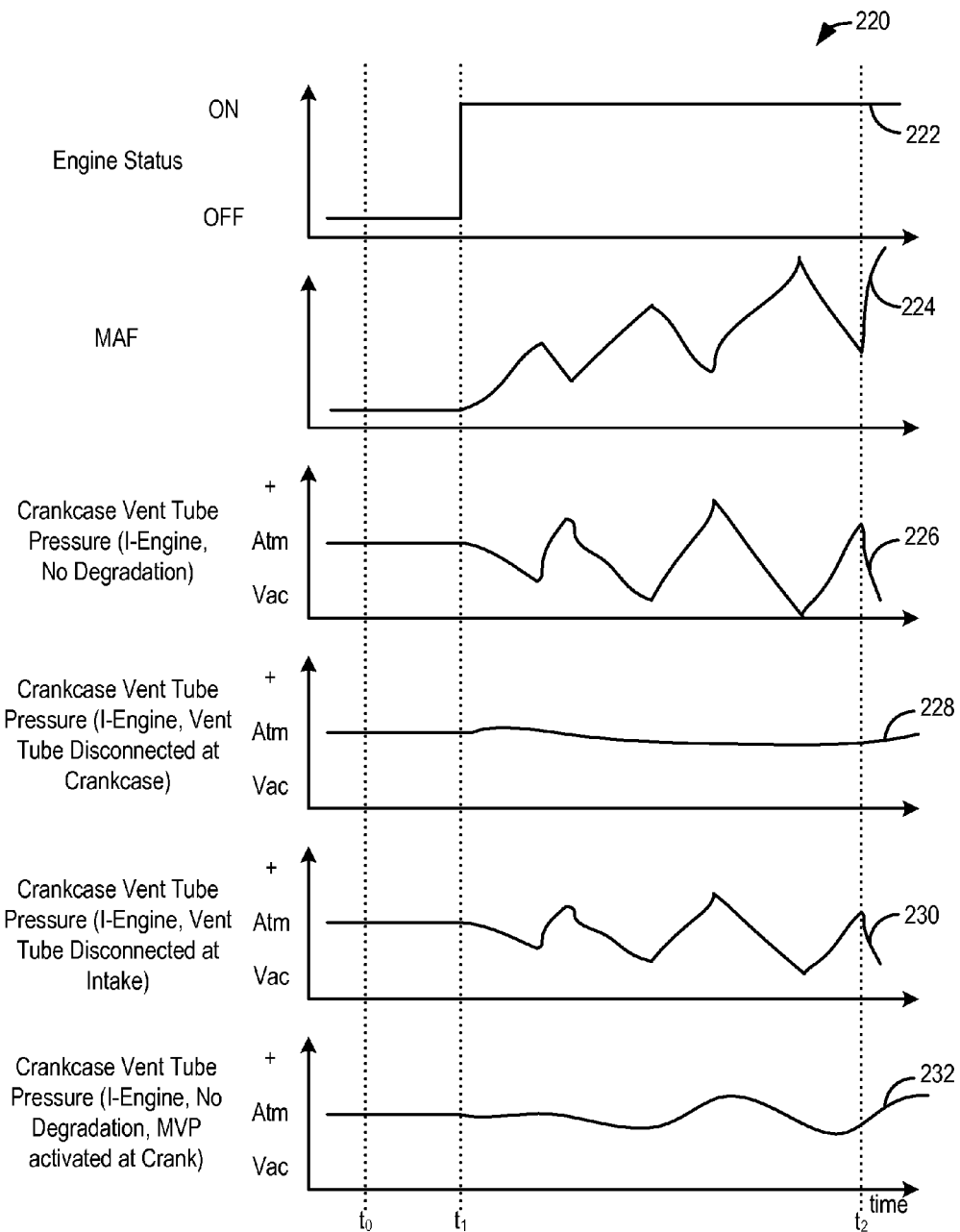

An example timeline 220 for engine crank in an I-type engine is shown in FIG. 2B. Specifically, timeline 220 shows crankcase vent tube pressure profiles at engine crank under various conditions. Timeline 220 includes plot 222, indicating an engine status over time, and plot 224, indicating an intake manifold air flow (MAF) over time. Timeline 220 further includes plot 226, indicating a crankcase vent tube pressure profile for an intact crankcase vent tube; plot 228, indicating a crankcase vent tube pressure profile where the vent tube is disconnected at the crankcase; and plot 230, indicating a crankcase vent tube pressure profile where the vent tube is disconnected at intake. Timeline 200 further includes plot 232, indicating a crankcase vent tube pressure profile where the vent tube is intact and the mechanical vacuum pump (MVP) is activated at engine crank.

At time $t_0$, the engine is off, as shown by plot 222. Accordingly, there is no airflow through the intake manifold, as shown by plot 224. For each of the scenarios shown by plots 226-232, the crankcase vent tube pressure is at atmosphere. At time $t_1$, the engine is turned on, and the MAF undergoes pressure pulsations that are individually discernable between time $t_1$ and time $t_2$. As shown in plot 226, with no vent tube degradation, the crankcase vent tube pressure experiences inverse pressure pulsations that align with the MAF pulsations. If the vent tube is disconnected at the crankcase, no significant pulsations in vent tube pressure are experienced, as shown by plot 228. This vent tube pressure profile may be used to diagnose a vent tube disconnected at the crankcase.

If the vent tube is disconnected at intake, the vent tube pressure pulsations may decrease, as shown by plot 230, as intake vacuum may draw air through the PCV line, crankcase, and vent tube. The pulsations may have different amplitudes, timing, or durations relative to the MAF pulsations. In some scenarios, this may be used to diagnose a vent tube disconnected at intake. If the MVP is activated at time $t_1$ (e.g., in response to demand from one or more vacuum devices) the exhaust from pump may overwhelm the pressure pulsations, even if the vent tube is intact, as shown by plot 232. Similar to the V-type engine, an erroneous crankcase ventilation degradation code may be set.

In either V or I type engines, as well as other engine types, an increased air flow during engine operation (e.g., during throttle opening) will result in a decrease in crankcase pressure. However, if the intake side of the crankcase vent line is disconnected, the crankcase pressure may remain relatively constant responsive to an increase in intake air flow.

Figure 2C:
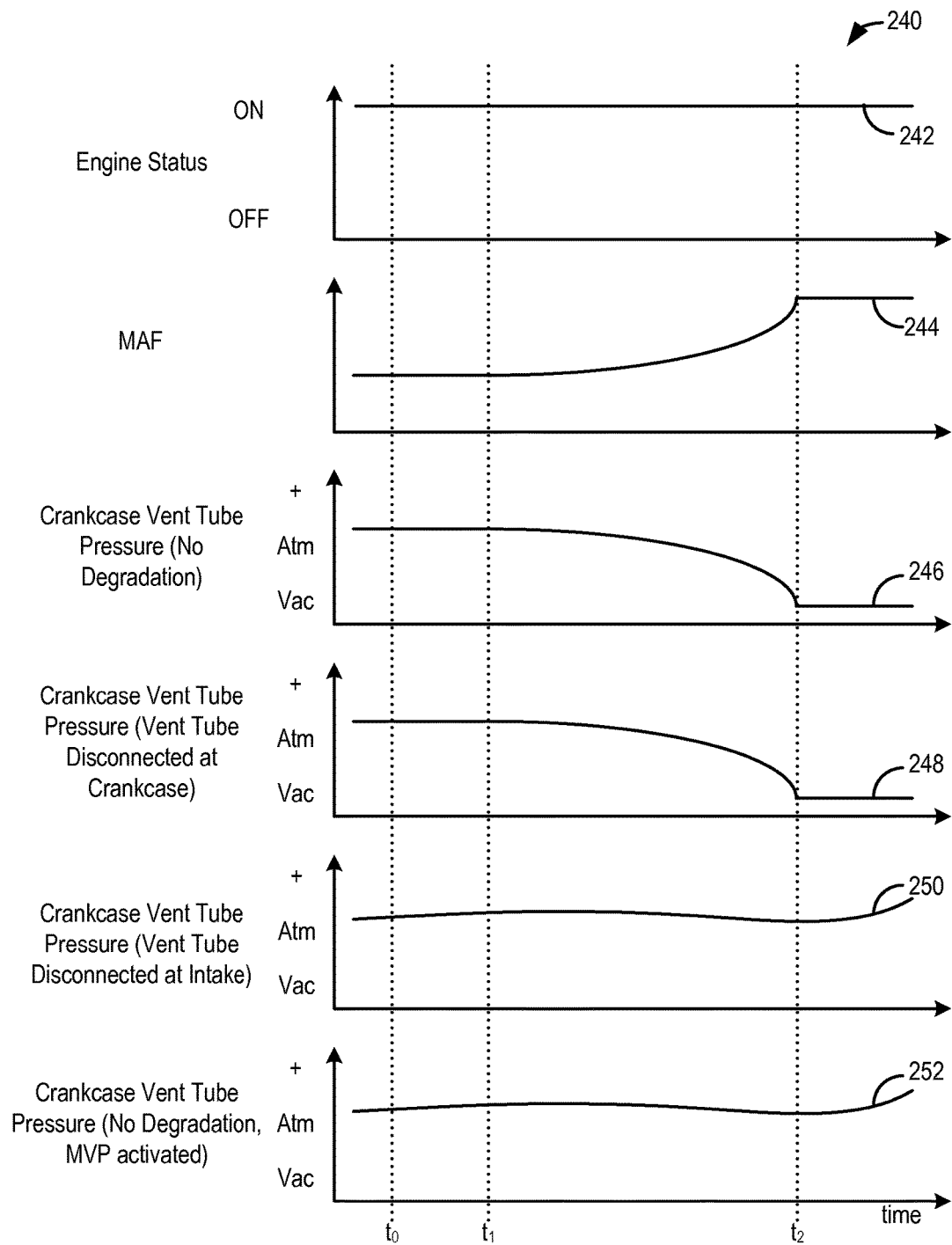

An example timeline 240 for an engine with an increasing air flow profile is shown in FIG. 2C. Specifically, timeline 240 shows crankcase vent tube pressure profiles for an engine with an increasing air flow profile under various conditions. Timeline 240 includes plot 242, indicating an engine status over time, and plot 244, indicating an intake manifold air flow (MAF) over time. Timeline 240 further includes plot 246, indicating a crankcase vent tube pressure profile for an intact crankcase vent tube; plot 248, indicating a crankcase vent tube pressure profile where the vent tube is disconnected at the crankcase; and plot 250, indicating a crankcase vent tube pressure profile where the vent tube is disconnected at intake. Timeline 250 further includes plot 252, indicating a crankcase vent tube pressure profile where the vent tube is intact and the mechanical vacuum pump (MVP) is activated.

At time $t_0$, the engine is on, as shown by plot 242. Accordingly, there is positive airflow through the intake manifold, as shown by plot 244. For each of the scenarios shown by plots 246-252, the crankcase vent tube pressure is slightly above atmosphere. At time $t_1$, engine airflow begins to increase, the MAF increases from time $t_1$ to time $t_2$. As shown in plot 246, with no vent tube degradation, the crankcase vent tube pressure decreases from time $t_1$ to time $t_2$. If the vent tube is disconnected at the crankcase, as shown in plot 248, the crankcase vent tube pressure may decrease with a similar profile to a vent tube with no degradation.

If the vent tube is disconnected at intake, the vent tube pressure may not decrease, as shown by plot 250. This profile may be used to diagnose a vent tube disconnected at intake. However, if the MVP is activated at time $t_1$ (e.g., in response to demand from one or more vacuum devices) the exhaust from pump may counteract the pressure decrease, even if the vent tube is intact, as shown by plot 252. An erroneous crankcase ventilation degradation code may thus be set.

Under the scenarios depicted in FIGS. 2A-2C, MVP operation may result in false failures of PCV diagnostic tests, particularly if one or more of the vacuum consumption devices have depleted vacuum stores. FIG. 3 schematically shows an example vehicle system 306 including an engine system 310 where the MVP is retained within the crankcase, but is exhausted external to the crankcase. Engine system 310 includes crankcase ventilation system 316, fuel system 318, evaporative emissions system 319, and lower portion of engine block 326. Engine system 310 may include a controller 312 including input/output ports 311 and an electronic storage medium 313. Controller 12 may receive various signals from sensors 317 coupled to engine system 310 and may monitor and adjust the position of various actuators 320 based on input received from the various sensors. Components of engine system 10 that are also included in engine system 310 may be assumed to have the same functions and parameters as introduced herein.

In this example, MVP 95 is coupled to exhaust conduit 330 which extends out of crankcase 28. An oil separator 332 may be disposed in exhaust conduit 330 to remove oil from the exhaust generated by MVP 95 when the pump is active. Fuel tank 20 is coupled to fuel vapor canister 90 via vent conduit 334. Fuel tank isolation valve 85 is included in conduit 334 such that fuel tank 20 is coupled to canister 90 via the valve. Exhaust conduit 330 merges with vent conduit 334 at junction 336, upstream of isolation valve 85. In this way, hydrocarbons contained within MVP exhaust that are not removed by oil separator 332 may be adsorbed by canister 90. In other configurations, conduit 330 may be coupled directly to fuel vapor canister 90, or may be coupled to vent 86 upstream of vent valve 87 or purge line 91 upstream of purge valve 92.

FTIV 85 may be closed or maintained closed when MVP 95 is activated to prevent pressurization of the fuel tank. Similarly, a one-way valve 338 may be disposed in exhaust conduit 330 upstream of junction 336 in order to prevent fuel tank vapors from entering crankcase 28. Valve 338 may be a passive valve, such as a check-valve, or may be an active valve. Hydrocarbons may be exhausted from MVP 95 to canister 90 via conduit 330 during all engine modes, including during engine combustion, battery-only mode, deceleration fuel cutoff mode, etc. When the engine is combusted, canister purging may occur based on engine operations, thereby purging MVP exhaust hydrocarbons to engine intake in a controlled fashion.

In the configuration shown in FIG. 3, the PCV tests are no longer subject to false failures due to MVP exhaust pressurizing the crankcase, excepting for circumstances where conduit 330 is degraded or disconnected at the crankcase side. Further, by exhausting the MVP to the fuel vapor canister, unmetered hydrocarbons entering the engine intake are reduced, leading to fewer engine stalls. Still further, if the MVP is activated while the engine is not combusting, the exhaust hydrocarbons will be captured rather than ported to intake via the PCV system, thus reducing emissions.

The systems depicted in FIG. 3 may thus enable methods for engine operation, including for PCV degradation testing. FIGS. 4A-4B depict a flow chart for one such high-level method 400. Instructions for carrying out method 400 may be executed by a controller based on instructions stored on a memory of the controller and in conjunction with signals received from sensors of the engine system, such as the sensors described above with reference to FIGS. 1 and 3. The controller may employ engine actuators of the engine system to adjust engine operation, according to the methods described below.

Method 400 begins at 402. At 402, method 400 includes evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc., and various ambient conditions, such as temperature, barometric pressure, humidity, etc.

Continuing at 404, method 400 includes determining whether an engine start-up event is detected. Detecting engine start-up may include detecting a crank-event, such as at key-on, and/or may include detecting a transition from an engine-off mode to an engine-on mode, such as a transition from battery-only mode to a combustion mode. If an engine start-up event is detected, method 400 proceeds to 406. At 406, method 400 includes determining whether an expected CVT pressure response is detected. For example, as shown in FIG. 2A, an engine start-up event for a V-type engine may result in a dip in CVT pressure. As shown in FIG. 2B, an engine start-up event for an I-type engine may result in characteristic pressure pulsations at the CVT pressure sensor. The expected pressure response may have a characteristic amplitude, timing, and duration, which may be adjusted based on current operating conditions. If the expected pressure response is not detected, method 400 proceeds to 408.

At 408, method 400 includes determining whether the MVP was on during the engine start-up event. If the MVP was not on, method 400 proceeds to 410. At 410, method 400 includes indicating that the crankcase side of the CVT is degraded. For example, degradation may be recorded at the controller, and an MIL may be illuminated. Continuing at 412, method 400 includes adjusting engine operations. For example, adjusting engine operations may include one or more of suspending additional PCV testing, adjusting expected A/F ratios based on adjustments to expected crankcase ventilation, delaying depletion of crankcase lubricant, limiting engine aspiration of crankcase lubricant, limiting engine speed, torque, and/or power, limiting or suspending boosted engine operations, adding lubricant to the crankcase, and/or other mitigating actions. Method 400 may then end.

Returning to 408, if the MVP was not on, method 400 proceeds to 414. At 414, method 400 includes determining whether the canister temperature increased while the MVP was on. The canister temperature may be determined by a dedicated canister temperature sensor (e.g., sensor 97) or may be estimated or inferred. The canister temperature increase may be representative of hydrocarbons adsorbing within the fuel vapor canister. As the FTIV is maintained closed during MVP operations, an increase in canister temperature may be indicative that the MVP exhaust conduit is intact. If the canister temperature increases, method 400 proceeds to 416. At 416, method 400 includes indicating that the MVP and MVP exhaust conduit are intact. Method 400 then proceeds to 410. Having determined that MVP exhaust is not responsible for the lack of CVT pressure response, CVT degradation may be indicated as described herein.

If the fuel vapor canister temperature does not increase, method 400 proceeds to 418. At 418, method 400 includes indicating that the MVP exhaust conduit is degraded. For example, degradation may be recorded at the controller, and an MIL may be illuminated. Continuing at 420, method 400 includes adjusting engine operations. For example, adjusting engine operations may include one or more of suspending additional PCV testing, adjusting expected A/F ratios based on adjustments to expected crankcase ventilation, limiting engine speed, torque, and/or power, limiting or suspending boosted engine operations, limiting operations that rely on vacuum reservoirs, adjusting MVP operations, adjusting vacuum storage, and other mitigating action. Method 400 may then end.

Returning to 406, if a CVT pressure response is detected at engine crank, method 400 proceeds to 422. At 422, method 400 includes indicating that the crankcase side of the CVT is intact. A passing test result may be recorded at the controller, and additional PCV testing adjusted accordingly. Method 400 then proceeds to 424. Method 400 also proceeds to 424 from 404, if no engine start-up is detected.

At 424, method 400 includes determining whether intake air flow is increasing. Intake air flow may be determined based on the output of an MAF sensor, or may be estimated or inferred. Determining whether intake air flow is increasing may include determining whether intake air flow is increasing at or above a threshold rate, and/or increasing from a threshold level. If the intake air flow is increasing, method 400 proceeds to 426. At 426, method 400 includes determining whether a CVT pressure response is detected. As depicted in FIG. 2C, an increase in intake air flow may be accompanied by a decrease in CVT pressure. The expected pressure response may have a characteristic amplitude, timing, and duration, which may be adjusted based on current operating conditions. If the expected pressure response is not detected, method 400 proceeds to 428.

At 428, method 400 includes determining whether the MVP was on during the increasing intake air flow event. If the MVP was not on, method 400 proceeds to 430. At 430, method 400 includes indicating that the intake side of the CVT is degraded. For example, degradation may be recorded at the controller, and an MIL may be illuminated. Continuing at 432, method 400 includes adjusting engine operations. For example, adjusting engine operations may include one or more of suspending additional PCV testing, adjusting expected A/F ratios based on adjustments to expected crankcase ventilation, delaying depletion of crankcase lubricant, limiting engine aspiration of crankcase lubricant, limiting engine speed, torque, and/or power, limiting or suspending boosted engine operations, adding lubricant to the crankcase, and/or other mitigating actions. Method 400 may then end.

Returning to 428, if the MVP was not on, method 400 proceeds to 434. At 434, method 400 includes determining whether the canister temperature increased while the MVP was on. If the canister temperature increases, method 400 proceeds to 436. At 436, method 400 includes indicating that the MVP and MVP exhaust conduit are intact. Method 400 then proceeds to 430. Having determined that MVP exhaust is not responsible for the lack of CVT pressure response, CVT degradation may be indicated as described herein.

If the fuel vapor canister temperature does not increase, method 400 proceeds to 438. At 438, method 400 includes indicating that the MVP exhaust conduit is degraded. For example, degradation may be recorded at the controller, and an MIL may be illuminated. Continuing at 440, method 400 includes adjusting engine operations. For example, adjusting engine operations may include one or more of suspending additional PCV testing, adjusting expected A/F ratios based on adjustments to expected crankcase ventilation, limiting engine speed, torque, and/or power, limiting or suspending boosted engine operations, limiting operations that rely on vacuum reservoirs, adjusting MVP operations, adjusting vacuum storage, and other mitigating action. Method 400 may then end.

Returning to 424, if intake air flow is not increasing, method 400 proceeds to 444. This portion of method 400 will be described with reference to FIG. 4B. Returning to 426, if a CVT pressure response is detected during the increasing intake air flow event, method 400 proceeds to 442. At 442, method 400 includes indicating that the intake side of the CVT is intact. A passing test result may be recorded at the controller, and additional PCV testing adjusted accordingly. Method 400 then proceeds to 444.

Turning to FIG. 4B, if intake air flow is not increasing, or if the intake side of the CVT has been indicated to be intact, method 400 proceeds to 450. At 450, method 400 includes determining whether a canister-side evaporative emissions leak test is indicated. This may include retrieving an indication to test from the controller, the expiration of a duration following a previous test, etc. If no leak test is indicated, method 400 proceeds to 452. At 452, method 400 includes maintaining the status of the fuel system. Method 400 may then end.

If a leak test is indicated, method 400 proceeds to 454. At 454, method 400 includes determining whether the MVP is on. If the MVP is not on, method 400 proceeds to 452, maintains the fuel system status, and then ends. If the MVP is on, method 400 proceeds to 456. At 456, method 400 includes sealing the evaporative emissions system. Sealing the evaporative emissions system may include closing or maintaining closed the FTIV, CPV, and CVV. In this way, exhaust from the MVP directed to the fuel vapor canister will pressurized the emissions system.

Continuing at 458, method 400 includes determining whether a pressure response is registered in the evaporative emissions system. The pressure response may be an indicated increase in pressure that is predetermined or based on operating conditions. In some examples, the fuel system may remain sealed following the deactivation of the MVP, and a bleed-down of the pressure compared to an expected rate of pressure bleed-down. The threshold pressure and/or rate of pressure may be determined based on expected pressure changes for an evaporative emissions system with degradation less than a threshold, for example, less than a 0.02" leak.

If the evaporative emissions system pressure response is not registered, method 400 proceeds to 460. At 460, method 400 includes indicating evaporative emissions system degradation. For example, degradation may be recorded at the controller, and an MIL may be illuminated. Continuing at 462, method 400 includes adjusting evaporative emissions system operations based on the degradation. For example, leak testing schedules may be adjusted, canister purge schedules may be adjusted, fuel tank venting may be adjusted, etc. Method 400 then proceeds to 464. At 464, method 400 includes unsealing the evaporative emissions system. For example, the CVV may be opened. Method 400 may then end.

If the evaporative emissions system pressure response is registered, method 400 proceeds to 466. At 466, method 400 includes indicating that the evaporative emissions system is intact. For example, a passing test result may be recorded at the controller. Continuing at 468, method 400 includes adjusting evaporative emissions system operations based on the passing test result. For example, leak testing schedules may be adjusted, canister purge schedules may be adjusted, fuel tank venting may be adjusted, etc. Method 400 then proceeds to 464, unseals the evaporative emissions system, and then ends.

Applying the method depicted in FIGS. 4A and 4B to the system depicted in FIG. 3 thus enables crankcase ventilation integrity testing that is not prone to false errors due to activation of a vacuum pump that exhausts into the crankcase. Further, the integrity of the vacuum pump exhaust line may be determined based on changes in fuel vapor canister temperature corresponding to exhaust hydrocarbon adsorption. Still further, the integrity of the canister side of the evaporative emissions system may be determined based on changes in fuel vapor canister pressure when the evaporative emissions system is sealed during vacuum pump exhaust events.

FIGS. 5A-5B show example timelines for operation of a V-type engine during an engine cranking event. Specifically, FIG. 5A shows an example timeline 500 for engine operation during a scenario wherein the crankcase side of the crankcase vent tube is intact, and wherein the MVP is on (and exhausting) during crank, while FIG. 5B shows an example timeline 501 for vehicle operation during a scenario wherein the crankcase side of the crankcase vent tube is disconnected, and wherein the MVP is off during crank. As shown in plots 208 and 212 in FIG. 2A, for an engine system wherein the MVP exhausts into the crankcase, these two scenarios may yield similar crankcase vent tube pressure profiles, leading to false-failures of a leak test when the MVP is on during crank.

Timeline 500 includes plot 505, indicating an engine status over time; plot 510, indicating an intake manifold air flow (MAF) over time; and plot 515, indicating a crankcase vent tube pressure over time. Timeline 500 further includes plot 520, indicating a canister temperature over time, plot 525, indicating a fuel tank isolation valve (FTIV) status over time; and plot 530, indicating the status of a mechanical vacuum pump (MVP) over time. Timeline 500 further includes plot 535, indicating whether intake-side crankcase vent tube (CVT) degradation is indicated over time; plot 540, indicating whether crankcase-side (CVT) degradation is indicated over time; and plot 545, indicating whether MVP exhaust conduit degradation is indicated over time.

At time $t_0$, the engine is off, as shown by plot 505. Accordingly, there is no airflow through the intake manifold, as shown by plot 510, and CVT pressure is at atmosphere, as indicated by plot 515. At time $t_1$, the engine is turned on, and the MAF increases, peaking at time $t_2$, before decreasing to an equilibrium level at time $t_3$. Also at time $t_1$, the FTIV is closed, as indicated by plot 525, and the MVP is turned on, as indicated by plot 530. As shown in plot 515, the crankcase vent tube pressure experiences a dip that coincides with the peak MAF at time $t_2$. As such, no intake side CVT degradation is indicated, as shown by plot 535, and no crankcase side degradation is indicated, as shown by plot 540. The MVP is maintained on from time $t_1$ to time $t_3$. As the FTIV is closed, the exhaust from the MVP is directed to the fuel vapor canister. Accordingly, the fuel vapor canister temperature increases from time $t_1$ to time $t_3$. As such, no MVP exhaust conduit degradation is indicated, as shown by plot 545.

Turning to FIG. 5B, timeline 501 includes plot 555, indicating an engine status over time; plot 560, indicating an intake manifold air flow (MAF) over time; and plot 565, indicating a crankcase vent tube pressure over time. Timeline 501 further includes plot 570, indicating a canister temperature over time, plot 575, indicating a fuel tank isolation valve (FTIV) status over time; and plot 580, indicating the status of a mechanical vacuum pump (MVP) over time. Timeline 501 further includes plot 585, indicating whether intake-side crankcase vent tube (CVT) degradation is indicated over time; plot 590, indicating whether crankcase-side (CVT) degradation is indicated over time; and plot 595, indicating whether MVP exhaust conduit degradation is indicated over time.

At time $t_0$, the engine is off, as shown by plot 555. Accordingly, there is no airflow through the intake manifold, as shown by plot 560, and CVT pressure is at atmosphere, as indicated by plot 565. At time $t_1$, the engine is turned on, and the MAF increases, peaking at time $t_2$, before decreasing to an equilibrium level at time $t_3$. Also at time $t_1$, the FTIV is closed, as indicated by plot 575. As shown in plot 565, the crankcase vent tube pressure does not experience a dip that coincides with the peak MAF at time $t_2$. As such, crankcase side CVT degradation is indicated, as shown by plot 585, but no intake side degradation is indicated, as shown by plot 590. The MVP is not turned on, as shown by plot 580, and the FTIV is maintained closed as shown by plot 575. Accordingly, canister temperature is relatively stable, as shown by plot 570, and no MVP exhaust conduit degradation is indicated, as shown by plot 595.

FIGS. 6A-6B show example timelines for operation of a V-type engine with an increasing air flow profile. Specifically, FIG. 6A shows an example timeline 600 for engine operation during a scenario wherein the intake side of the crankcase vent tube is intact, and wherein the MVP is on (and exhausting) during crank, while FIG. 6B shows an example timeline 601 for vehicle operation during a scenario wherein the intake side of the crankcase vent tube is disconnected, and wherein the MVP is off. As shown in plots 250 and 252 in FIG. 2C, for an engine system wherein the MVP exhausts into the crankcase, these two scenarios may yield similar crankcase vent tube pressure profiles, leading to false-failures of a leak test when the MVP is on while the intake air flow is increasing.

Timeline 600 includes plot 605, indicating an engine status over time; plot 610, indicating an intake manifold air flow (MAF) over time; and plot 615, indicating a crankcase vent tube pressure over time. Timeline 600 further includes plot 620, indicating a canister temperature over time, plot 625, indicating a fuel tank isolation valve (FTIV) status over time; and plot 630, indicating the status of a mechanical vacuum pump (MVP) over time. Timeline 600 further includes plot 635, indicating whether intake-side crankcase vent tube (CVT) degradation is indicated over time; plot 640, indicating whether crankcase-side (CVT) degradation is indicated over time; and plot 645, indicating whether MVP exhaust conduit degradation is indicated over time.

At time $t_0$, the engine is on, as shown by plot 605, the intake air flow is stable, as shown by plot 610, and CVT pressure is at atmosphere, as indicated by plot 615. At time $t_1$, the MAF begins to increase, reaching a plateau at time $t_2$. Also at time $t_1$, the MVP is turned on, as indicated by plot 630, while the FTIV is maintained closed, as indicated by plot 625. As shown in plot 615, the crankcase vent tube pressure experiences a decrease that is proportionate to the MAF from time $t_1$ to time $t_2$. As such, no intake side CVT degradation is indicated, as shown by plot 635, and no crankcase side degradation is indicated, as shown by plot 640. The MVP is maintained on from time $t_1$ to time $t_2$. As the FTIV is closed, the exhaust from the MVP is directed to the fuel vapor canister. Accordingly, the fuel vapor canister temperature increases from time $t_1$ to time $t_3$, as indicated by plot 620. As such, no MVP exhaust conduit degradation is indicated, as shown by plot 645.

Turning to FIG. 6B, timeline 601 includes plot 655, indicating an engine status over time; plot 660, indicating an intake manifold air flow (MAF) over time; and plot 665, indicating a crankcase vent tube pressure over time. Timeline 601 further includes plot 670, indicating a canister temperature over time, plot 675, indicating a fuel tank isolation valve (FTIV) status over time; and plot 680, indicating the status of a mechanical vacuum pump (MVP) over time. Timeline 601 further includes plot 685, indicating whether intake-side crankcase vent tube (CVT) degradation is indicated over time; plot 690, indicating whether crankcase-side (CVT) degradation is indicated over time; and plot 695, indicating whether MVP exhaust conduit degradation is indicated over time.

At time $t_0$, the engine is on, as shown by plot 655, the intake air flow is stable, as shown by plot 660, and CVT pressure is at atmosphere, as indicated by plot 665. At time $t_1$, the MAF begins to increase, reaching a plateau at time $t_2$. The FTIV is maintained closed, as indicated by plot 675, and the MVP is maintained off, as indicated by plot 680. As shown in plot 665, the crankcase vent tube pressure does not experience a decrease that is proportionate to the MAF from time $t_1$ to time $t_2$. As such, intake side CVT degradation is indicated, as shown by plot 685, but no crankcase side degradation is indicated, as shown by plot 690. The MVP is not turned on, as shown by plot 680, and the FTIV is maintained closed as shown by plot 675. Accordingly, canister temperature is relatively stable, as shown by plot 670, and no MVP exhaust conduit degradation is indicated, as shown by plot 695.

FIG. 7 shows an example timeline for operation of a V-type engine. Specifically, FIG. 7 shows an example timeline 700 for engine operation including mechanical vacuum pump exhaust conduit diagnostic tests. Timeline 700 includes plot 705, indicating an engine status over time; plot 710, indicating an intake manifold air flow (MAF) over time; and plot 715, indicating a crankcase vent tube pressure over time. Timeline 700 further includes plot 720, indicating a canister temperature over time, plot 725, indicating a fuel tank isolation valve (FTIV) status over time; and plot 730, indicating the status of a mechanical vacuum pump (MVP) over time. Timeline 700 further includes plot 735, indicating whether intake-side crankcase vent tube (CVT) degradation is indicated over time; plot 740, indicating whether crankcase-side (CVT) degradation is indicated over time; and plot 745, indicating whether MVP exhaust conduit degradation is indicated over time.

At time $t_0$, the engine is off, as shown by plot 705. Accordingly, there is no airflow through the intake manifold, as shown by plot 710, and CVT pressure is at atmosphere, as indicated by plot 715. At time $t_1$, the engine is turned on, and the MAF increases, peaking at time $t_2$, before decreasing to an equilibrium level at time $t_3$. Also at time $t_1$, the FTIV is closed, as indicated by plot 725, and the MVP is turned on, as indicated by plot 730. As shown in plot 715, the crankcase vent tube pressure does not experience a dip that coincides with the peak MAF at time $t_2$. The MVP is maintained on from time $t_1$ to time $t_3$. As the FTIV is closed, the exhaust from the MVP is directed to the fuel vapor canister. However, the fuel vapor canister temperature does not increase significantly from time $t_1$ to time $t_3$. As such, MVP exhaust conduit degradation is indicated, as shown by plot 745, but no intake side or crankcase side degradation of the CVT is indicated, as shown by plots 735 and 740, respectively.

At time $t_3$, the MVP is turned off, as shown by plot 730, the intake air flow is decreasing slightly, as shown by plot 710, and CVT pressure is increasing slightly, as indicated by plot 715. At time $t_4$, the MAF begins to increase, reaching a plateau at time $t_5$. The FTIV is maintained closed, as indicated by plot 725, and the MVP is turned on, as shown by plot 730. As shown in plot 715, the crankcase vent tube pressure does not experience a decrease that is proportionate to the MAF from time $t_4$ to time $t_5$. With the MVP turned on and the FTIV maintained closed, MVP exhaust should be directed to the fuel vapor canister. However, canister temperature is relatively stable, as shown by plot 720. Accordingly, MVP exhaust conduit degradation is indicated, as shown by plot 745. No intake side CVT degradation is indicated, as shown by plot 735, and no crankcase side degradation is indicated, as shown by plot 740.

FIG. 8 shows an example timeline for operation of a V-type engine. Specifically, FIG. 8 shows an example timeline 800 for engine operation including an evaporative emissions leak test. Timeline 800 includes plot 805, indicating an engine status over time; and plot 810, indicating the status of a mechanical vacuum pump (MVP) over time. Timeline 800 further includes plot 815, indicating a fuel tank isolation valve (FTIV) status over time; plot 820, indicating a canister purge valve (CPV) status over time; and plot 825, indicating a canister vent valve (CVV) status over time. Timeline 800 further includes plots 830 and 832, indicating a fuel vapor canister pressure over time; and plots 835 and 837, indicating whether the degradation of the canister side of the evaporative emissions system is indicated over time. Plots 830 and 835 represent a system wherein the canister side of the evaporative emissions system is intact, while, plots 832 and 837 represent a system wherein the canister side of the evaporative emissions system is degraded.

At time $t_1$, the engine is on, as indicated by plot 805, and the MVP is off, as indicated by plot 810. The FTIV and CPV are closed, as indicated by plots 815 and 820, respectively, and the CVV is open, as indicated by plot 825. Accordingly, the canister pressure is at atmosphere, as indicated by plot 830. At time $t_1$, the MVP is turned on. A leak test begins at time $t_2$, with the closing of the CVV. In this conformation, with the FTIV, CPV, and CVV closed and the MVP exhausting to the fuel vapor canister, the canister pressure increases, from time $t_2$ to time $t_3$, when the MVP is turned off. The evaporative emissions system remains sealed from time $t_3$ to time $t_4$, and the canister pressure decays towards atmosphere, as shown by plots 830 and 832. For the system with degradation (plot 832) the pressure decays more rapidly than for an intact system (plot 830). Accordingly, degradation is indicated by plot 837, but not by plot 835.

The systems described herein and with reference to FIG. 3 along with the methods described herein and with reference to FIGS. 4A-4B may enable one or more systems and one or more methods. In one example, a system for an engine is provided, the system comprising a vacuum pump at least partially deposed within an engine crankcase, and a fuel vapor canister coupled to an exhaust conduit of the vacuum pump via a one-way valve. In such an example, the system may additionally or alternatively comprise a fuel tank coupled to the fuel vapor canister via a vent conduit, and a fuel tank isolation valve coupled to the vent conduit, and wherein the exhaust conduit of the vacuum pump is mechanically connected to the vent conduit between the fuel tank isolation valve and the fuel vapor canister. In any of the preceding examples wherein the exhaust conduit of the vacuum pump is mechanically connected to the vent conduit between the fuel tank isolation valve and the fuel vapor canister, the system may additionally or alternatively comprise a crankcase vent tube mechanically connected to the engine crankcase via an oil separator and mechanically connected to an intake passage of the engine, and a pressure sensor deposed within the crankcase vent tube. In any of the preceding example systems comprising a crankcase vent tube, the fuel vapor canister may additionally or alternatively be mechanically connected to the intake passage of the engine via a purge line, and the purge line may additionally or alternatively be mechanically connected to the intake passage upstream of the crankcase vent tube. In any of the preceding examples wherein the system comprises a purge line, the system may additionally or alternatively comprise a canister purge valve deposed within the purge line, a canister vent valve deposed within a vent line coupled between the fuel vapor canister and atmosphere, and a pressure sensor deposed within the vent line. In any of the preceding examples, the system may additionally or alternatively comprise an oil separator coupled between the vacuum pump and the valve and the one-way valve may additionally or alternatively be a check valve. In any of the preceding examples, the vacuum pump may additionally or alternatively be coupled to a camshaft cover of the engine crankcase. In any of the preceding examples, the vacuum pump may additionally or alternatively be configured to provide vacuum for a brake booster. The technical effect of implementing this system is a reduction in engine stalls due to unmetered fuel vapor entering engine intake. By routing the vacuum pump exhaust to the fuel vapor canister, hydrocarbons entrained from the crankcase lubricants may be temporarily stored and then purged to intake along with adsorbed fuel vapor. In this way, the amount of fuel vapor entering intake may be effectively regulated.

In another example, a method for an engine is prevented, the method comprising routing exhaust of a vacuum pump deposed within an engine crankcase to a fuel vapor canister where actuation of the vacuum pump does not alter a pressure within the engine crankcase, and indicating degradation of a crankcase vent tube based on a crankcase vent tube pressure during a condition where an intake manifold vacuum is dynamically changing. In such an example, the method may additionally or alternatively comprise indicating degradation of an intake side of the crankcase vent tube based on a crankcase vent tube pressure during an engine crank event. In any of the preceding examples wherein degradation of the intake side of the crankcase vent tube based on a crankcase vent tube pressure during an engine crank event, the method may additionally or alternatively comprise indicating degradation of a vacuum pump exhaust line based on a fuel vapor canister temperature and a crankcase vent tube pressure during an engine crank event, and not indicating degradation of the intake side of the crankcase vent tube based on a crankcase vent tube pressure during an engine crank event responsive to a fuel vapor canister temperature change below a threshold. In any of the preceding examples, the method may additionally or alternatively comprise indicating degradation of a crankcase side of the crankcase vent tube based on a crankcase vent tube pressure during a condition wherein engine intake air flow is increasing. In any of the preceding examples wherein degradation of the crankcase side of the crankcase vent tube is indicated based on a crankcase vent tube pressure during a condition wherein engine intake air flow is increasing, the method may additionally or alternatively comprise indicating degradation of a vacuum pump exhaust line based on a fuel vapor canister temperature and a crankcase vent tube pressure during a condition wherein engine intake air flow is increasing, and not indicating degradation of the crankcase side of the crankcase vent tube based on a crankcase vent tube pressure during an engine crank event responsive to a fuel vapor canister temperature change below a threshold. In any of the preceding examples, the method may additionally or alternatively comprise sealing an evaporative emissions system during a condition wherein the vacuum pump is activated, and indicating degradation of a canister side of an evaporative emissions system based on a fuel vapor canister pressure. In any of the preceding examples, the method may additionally or alternatively comprise adjusting engine operations responsive to an indication of degradation of a crankcase vent tube. The technical effect of implanting this method is a reduction in false-failures for crankcase ventilation system integrity tests. By routing the vacuum pump exhaust out of the crankcase, the crankcase pressure is not affected by vacuum pump activation, and thus is more accurately representative of the airflow through the crankcase via the crankcase ventilation system. In this way, warranty service on the vehicle may be reduced, thus reducing repair and maintenance costs.

In yet another example, a method for an engine is provided, comprising indicating degradation of an exhaust line of a vacuum pump deposed within a crankcase based on a fuel vapor canister temperature and a crankcase vent tube pressure, not indicating degradation of a crankcase vent tube based on a crankcase pressure responsive to an indication of degradation of the exhaust line, and adjusting engine operations responsive to an indication of degradation of the exhaust line. In such an example, the method may additionally or alternatively comprise, during an engine crank event, indicating an crankcase side of the crankcase vent tube is intact responsive to an observed crankcase pressure change within a threshold of an expected crankcase pressure change, and during the engine crank event, indicating degradation of the exhaust line responsive to an observed crankcase pressure change outside of a threshold of an expected crankcase pressure change and a fuel vapor canister temperature change below a threshold temperature change. In any of the preceding methods, the method may additionally or alternatively comprise during a condition wherein engine intake air flow is increasing, indicating an intake side of a crankcase vent tube is intact responsive to an observed crankcase pressure change within a threshold of an expected crankcase pressure change, and during the condition wherein engine intake air flow is increasing, indicating degradation of the exhaust line responsive to an observed crankcase pressure change outside of a threshold of an expected crankcase pressure change and a fuel vapor canister temperature change below a threshold temperature change. In any of the preceding examples, the method may additionally or alternatively comprise closing a fuel tank isolation valve responsive to activation of the vacuum pump. In any of the preceding examples wherein a fuel tank isolation valve is closed responsive to activation of the vacuum pump, the method may additionally or alternatively comprise closing a canister vent valve responsive to activation of the vacuum pump, and indicating degradation of a canister side of an evaporative emissions system based on a fuel vapor canister pressure. The technical effect of implementing this system is that vacuum pump integrity may be ascertained via existing sensors. Temperature and pressure sensors at or near the fuel vapor canister may thus be leveraged to diagnose faults in the crankcase. In this way, a comprehensive diagnostic of crankcase airflow may be provided without adding additional sensors to the system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A system for an engine, comprising:
   a vacuum pump at least partially deposed within an engine crankcase;
   a fuel vapor canister coupled to an exhaust conduit of the vacuum pump via a one-way valve and to a fuel tank via a vent conduit; and a fuel tank isolation valve coupled to the vent conduit, the exhaust conduit mechanically connected to the vent conduit between the fuel tank isolation valve and the fuel vapor canister.

2. The system of claim 1, further comprising:
a crankcase vent tube mechanically connected to the engine crankcase via an oil separator and mechanically connected to an intake passage of the engine; and
a pressure sensor deposed within the crankcase vent tube.

3. The system of claim 2, wherein the fuel vapor canister is mechanically connected to the intake passage of the engine via a purge line, the purge line mechanically connected to the intake passage upstream of the crankcase vent tube.

4. The system of claim 3, further comprising:
a canister purge valve deposed within the purge line;
a canister vent valve deposed within a vent line coupled between the fuel vapor canister and atmosphere; and
a pressure sensor deposed within the vent line.

5. The system of claim 1, further comprising an oil separator coupled between the vacuum pump and the valve, and wherein the one-way valve is a check valve.

6. The system of claim 1, wherein the vacuum pump is coupled to a camshaft cover of the engine crankcase.

7. The system of claim 1, wherein the vacuum pump is configured to provide vacuum for a brake booster.

8. A method for an engine, comprising:
routing exhaust of a vacuum pump deposed within an engine crankcase to a fuel vapor canister via an exhaust conduit of the vacuum pump, the exhaust conduit coupled to a vent conduit between a fuel tank isolation valve and the fuel vapor canister, where the fuel tank isolation valve is closed, and where actuation of the vacuum pump does not alter a pressure within the engine crankcase; and
indicating degradation of a crankcase vent tube based on a crankcase vent tube pressure during a condition where an intake manifold vacuum is dynamically changing.

9. The method of claim 8, further comprising:
indicating degradation of an intake side of the crankcase vent tube based on a crankcase vent tube pressure during an engine crank event.

10. The method of claim 9, further comprising:
indicating degradation of a vacuum pump exhaust line based on a fuel vapor canister temperature and the crankcase vent tube pressure during the engine crank event; and
not indicating degradation of the intake side of the crankcase vent tube based on the crankcase vent tube pressure during the engine crank event responsive to a fuel vapor canister temperature change below a threshold.

11. The method of claim 8, further comprising:
indicating degradation of a crankcase side of the crankcase vent tube based on the crankcase vent tube pressure during a condition wherein engine intake air flow is increasing.

12. The method of claim 11, further comprising:
indicating degradation of a vacuum pump exhaust line based on a fuel vapor canister temperature and the crankcase vent tube pressure during the condition wherein engine intake air flow is increasing; and
not indicating degradation of the crankcase side of the crankcase vent tube based on the crankcase vent tube pressure during an engine crank event responsive to a fuel vapor canister temperature change below a threshold.

13. The method of claim 8, further comprising:
sealing an evaporative emissions system during a condition wherein the vacuum pump is activated; and
indicating degradation of a canister side of the evaporative emissions system based on a fuel vapor canister pressure.

14. The method of claim 8, further comprising:
adjusting engine operations responsive to an indication of degradation of the crankcase vent tube.

15. A method for an engine, comprising:
indicating degradation of an exhaust line of a vacuum pump deposed within a crankcase based on a fuel vapor canister temperature and a crankcase vent tube pressure;
not indicating degradation of a crankcase vent tube based on a crankcase pressure responsive to the indication of degradation of the exhaust line;
adjusting engine operations responsive to the indication of degradation of the exhaust line;
during an engine crank event, indicating a crankcase side of the crankcase vent tube is intact responsive to an observed crankcase pressure change within a threshold of an expected crankcase pressure change; and
during the engine crank event, indicating degradation of the exhaust line responsive to the observed crankcase pressure change outside of a threshold of the expected crankcase pressure change and a fuel vapor canister temperature change below a threshold temperature change.

16. The method of claim 15, further comprising:
during a condition wherein engine intake air flow is increasing, indicating an intake side of the crankcase vent tube is intact responsive to an observed crankcase pressure change within a threshold of an expected crankcase pressure change; and
during the condition wherein engine intake air flow is increasing, indicating degradation of the exhaust line responsive to the observed crankcase pressure change outside of a threshold of the expected crankcase pressure change and the fuel vapor canister temperature change below the threshold temperature change.

17. The method of claim 15, further comprising:
closing a fuel tank isolation valve responsive to activation of the vacuum pump.

18. The method of claim 17, further comprising:
closing a canister vent valve responsive to activation of the vacuum pump; and
indicating degradation of a canister side of an evaporative emissions system based on a fuel vapor canister pressure.

* * * * *